United States Patent
Yang et al.

(10) Patent No.: US 9,436,893 B2
(45) Date of Patent: Sep. 6, 2016

(54) DISTRIBUTED SIMILARITY LEARNING FOR HIGH-DIMENSIONAL IMAGE FEATURES

(71) Applicant: Adobe Systems Incorporated, San Jose, CA (US)

(72) Inventors: Jianchao Yang, San Jose, CA (US); Zhaowen Wang, Urbana, IL (US); Zhe Lin, Fremont, CA (US); Jonathan Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 158 days.

(21) Appl. No.: 14/091,972

(22) Filed: Nov. 27, 2013

(65) Prior Publication Data
US 2015/0146973 A1    May 28, 2015

(51) Int. Cl.
*G06K 9/62* (2006.01)

(52) U.S. Cl.
CPC ........... *G06K 9/6269* (2013.01); *G06K 9/6235* (2013.01)

(58) Field of Classification Search
CPC .................. G06K 9/6256; G06K 9/6215
USPC ........................................................ 382/159
See application file for complete search history.

(56) References Cited

U.S. PATENT DOCUMENTS

| | | | |
|---|---|---|---|
| 2004/0151384 A1* | 8/2004 | Yang et al. | 382/225 |
| 2006/0136478 A1* | 6/2006 | Berkner | 707/102 |
| 2007/0271278 A1* | 11/2007 | Acharya | 707/100 |
| 2009/0185746 A1* | 7/2009 | Mian et al. | 382/209 |

OTHER PUBLICATIONS

Ella Bingham etal."Random projection in dimensionality reduction:Applications to image and text data", KDD'01 Proceeding of the seventh ACM SIGKDD international conference on Knowledge discovery and data mining, pp. 245-250, 2001.*

Lance Parsons et al."Subspace Clustering for High Dimensional Data: A Review", ACM SIGKDD Explorations Newsletter-Special Issue on learning imbalanced datasets, vol. 6, Issue 1, pp. 90-105, Jun. 2004.*

Michael Raymer et al. Dimensionality Reduction Using Genetic Algorithms, IEEE Transactions on Evolutionary Compution, vol. 4, No. 2, pp. 164-171, Jul. 2000.*

I.K. Fodor "A survey of Dimension Reductio Techniques", U.S. Department of Energy, May 9, 2002.*

Lior Rokach et al. "Data mining for improving the quality of manufacturing: a feature set decomposition approach", Journal of intelligent Manufacturing , 2006-Springer vol. 17, Issue 3, pp. 285-299.*

* cited by examiner

*Primary Examiner* — Samir Ahmed
(74) *Attorney, Agent, or Firm* — Shook, Hardy & Bacon LLP (57) ABSTRACT

A system and method for distributed similarity learning for high-dimensional image features are described. A set of data features is accessed. Subspaces from a space formed by the set of data features are determined using a set of projection matrices. Each subspace has a dimension lower than a dimension of the set of data features. Similarity functions are computed for the subspaces. Each similarity function is based on the dimension of the corresponding subspace. A linear combination of the similarity functions is performed to determine a similarity function for the set of data features.

20 Claims, 5 Drawing Sheets

DISTRIBUTED SIMILARITY LEARNING FOR HIGH-DIMENSIONAL IMAGE FEATURES

TECHNICAL FIELD

The present application relates generally to the technical field of similarity computation, and, in various embodiments, to systems and methods for distributed similarity learning for high-dimensional image features.

BACKGROUND

Similarity learning is a type machine learning task in artificial intelligence. The goal of similarity learning or metric learning is to learn, from examples, a function that measures how similar or related two objects are. For example, a distance function over objects may be learned by finding appropriate similarity measurements between pairs of instances that preserve a desired distance structure. In other words, similarity learning is a supervised method to learn a similarity measure between examples based on their class information. Similarity learning can be applied, for example, to ranking and recommendation systems. However, with the ever-growing database size and the trend to use high-dimensional image descriptors, traditional similarity learning algorithms have become impractical to compute because of the temporal and spatial complexity resulting from the high dimensions.

BRIEF DESCRIPTION OF THE DRAWINGS

Some embodiments of the present disclosure are illustrated by way of example, and not limitation, in the figures of the accompanying drawings, in which like reference numbers indicate similar elements and in which.

DETAILED DESCRIPTION

The description that follows includes illustrative systems, methods, techniques, instruction sequences, and computing machine program products that describe example embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Systems and methods for distributed similarity learning of high-dimensional image features are described. A large similarity matrix corresponding to visual features in an image may be decomposed into smaller similarity matrices (or sub-matrices or blocks) so that each sub-matrix can be processed or learned independently (e.g., in parallel). In an example embodiment, processing the decomposed sub-matrices independently, in parallel, allows scaling without significant loss in performance. Thus, processing of the large similarity matrix, corresponding to one or more high-dimensional image features, may be distributed in that the decomposed blocks or sub-matrices are then individually processed in parallel, as opposed to processing the large similarity matrix itself. In an example embodiment, the methods and systems described herein may be deployed in existing applications such Adobe LightRoom™, Photoshop™, Photoshop Camera Raw™, Photoshop Elements™, Content Intelligence Toolkit™, Photoshop Touch™, Adobe Digital Publishing Suite™ and/or any other digital image processing application. It should, however, be noted that the term "image" includes static images (e.g., photographs in an image library), video images, or any other visual objects.

In an example embodiment, an image similarity learning method determines an image similarity measure between images (e.g., static or video images) each having a large image data size (e.g., millions of pixels) and a high image feature dimension (e.g., color characteristics of an image, contrast, shape, gradient, texture). The image similarity measure may be calculated using a similarity function. The image similarity measure between images (or their representations) can then be used to associate the same tag, title, description, or metadata to similar images or rank the images based on their similarities. For example, two images that are considered similar share the same metadata (e.g., a tag or title). A user can then organize and query relevant photos from his or her collection of photos based on a search using a particular tag.

In one example embodiment, because of the large image data size, the image similarity learning method is performed in a distributed manner using a distributed processing system (e.g., a multiple processors, multiple processor cores, network of servers, or the like). Thus, portions of the process of the image similarity learning method may be performed in parallel on different machines (virtual or otherwise) using the distributed processing system. The present disclosure, by way of example, describes the structure of a similarity function that is expressed in a bilinear form. The bilinear form may include a large similarity matrix corresponding to large image data size. The large similarity matrix may then be decomposed into small blocks so that the similarity function for each block can be learned independently, in parallel, using the distributed processing system. A linear combination of the similarity functions of the blocks is then performed to determine the similarity function corresponding to the large similarity matrix.

In an example embodiment, the large similarity matrix may include a set of data features of one or more images. For example, the data features may include vectors corresponding to data points represented in the image. A data point may include a location, color, and other characteristics in the image. The image may be broken down or decomposed into a set of data features based on the data points. The set of data features form a vector space that can be expressed in a bilinear form as further described below.

Subspaces from the vector space formed by a subset of the data features may be determined. A subspace may be a space having a dimension substantially lower than a dimension of the set of data features. A similarity function for each subspace may be computed independently and in parallel using the distributed processing system. Each similarity function may be learned based on the dimension of the corresponding subspace. A linear combination of the similarity functions of all subspaces is then performed to determine the similarity function corresponding to the vector space formed by the set of data features.

The example embodiments described herein may be implemented on a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Example Embodiments

Figure 1:
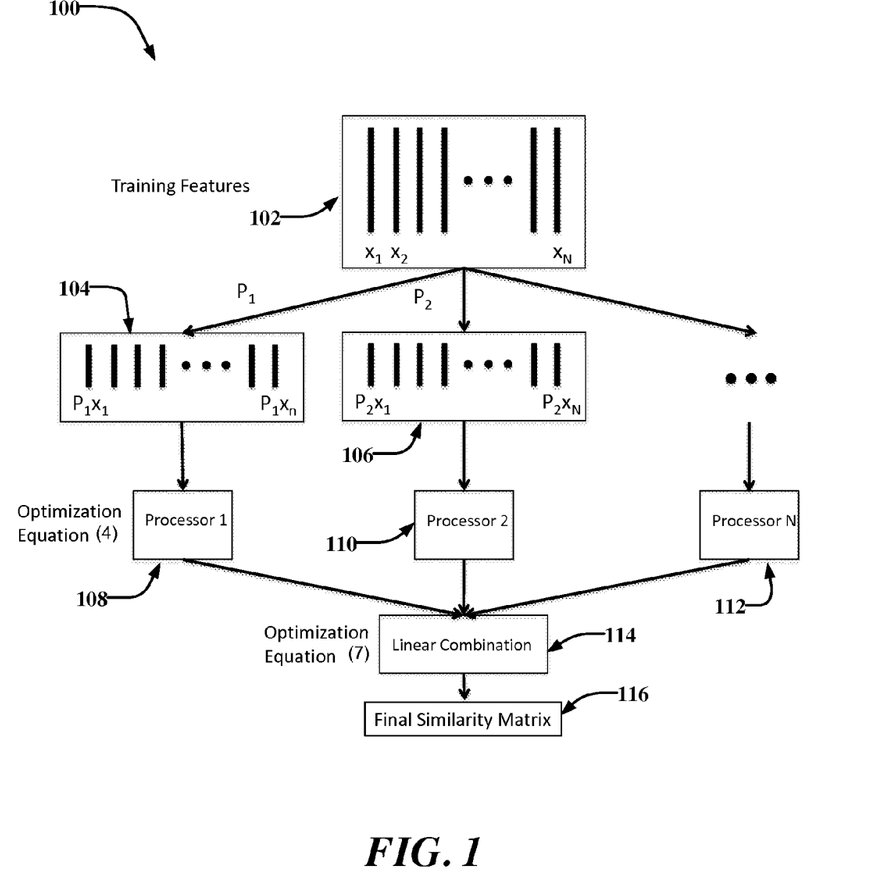
FIG. 1 is a diagram illustrating a method, in accordance with an example embodiment, for distributed similarity learning of high-dimensional image features.

FIG. 1 is a diagram illustrating a method 100, in accordance with an example embodiment, for distributed similarity learning of high-dimensional image features. A set of data features 102 (e.g., $x_1, x_2, x_n$) corresponding to an image may be accessed. The image may be broken down or decomposed into a set of data features based characteristics such as texture and contrast in the image. The set of data features may include vectors corresponding to data points represented in the image. The vectors may form a space corresponding to the set of data features. In an example embodiment, the set of data features 102 may also be referred to as training features for the method 100. As such, the similarity learning method may analyze or process the set of data features 102 to learn a similarity function corresponding to the set of data features 102. Examples of data features include, but are not limited to, visual features such colors of pixels and the location thereof within the image, texture features, shape features, gradient features, Scale Invariant Feature Transform (SIFT) features, Gist features, and/or the like.

Because the set of data features 102 may include a large number of data features from large data image size (e.g., millions of pixels), the set of data features 102 in an example embodiment, is broken down into multiple sets of lower dimensional data features 104, 106. For example, the space corresponding to the set of data features is broken down into subspaces with each subspace corresponding to a set of lower dimensional data features. Thus, each set of lower dimensional data features 104, 106 may include a substantially lower number of data points than the set of data features 102. For example, substantially lower may refer to orders of 10 times or more. In an example embodiment, the set of data features 102 is broken down into the multiple sets of lower dimensional data features 104, 106 by using a set of projection matrices ($P_1, P_2, P_n$). Thus, a large set of data features associated with an image may be processed to form a plurality of subsets of data features using a set of projection matrices. Examples of the projection matrices are discussed in more detail below.

An optimization method may then be applied to the lower dimensional data features 104, 106, 112. For example, a different processor may be used to execute an optimization equation for each set of lower dimensional data features 104, 106. The optimization equation includes learning a lower dimensional similarity function by finding an optimal matrix of the lower dimensional similarity function to generate a similarity measure that is consistent with the set of lower dimensional data features as constraints. Thus, as shown by way of example in FIG. 1, a first processor 108 may operate to solve the optimization equation based on the set of lower dimensional data features 104, a second processor 110 may operate to solve the optimization equation based on the set of lower dimensional data features 106, and so on.

In one example embodiment, the set of data features 102 may be broken down into a number of sets of lower dimensional data features based on the number of processors available to perform optimization equations (e.g., similarity functions). Thus, if N processors are available, then the set of data features 102 may be processed to form N sets of lower dimensional data features. It should be noted that the processors 108, 110, and 112 may be virtual processors within a physical machine. In an example embodiment, two or more of the set of lower dimensional data features may be processed on different cores of a processor having multiple cores.

Once the lower dimensional similarity functions are learned, a linear combination 114 of the multiple lower dimensional similarity functions for each set of lower dimensional data features 104 is performed to generate a final similarity matrix 116.

Referring back to the similarity functions computed in the processors 108, 110, and 112, an image similarity measure may be determined using a similarity learning algorithm (also referred to herein as distance metric learning algorithm), for learning a distance function (or similarity function), over objects such that the distance function (or metric function) operates within constraints of training features defined by the set of data features 102. Accordingly, the similarity function of the metric learning algorithm may find the parameters of the metric function such that it best agrees with constraints of the set of data features 102.

Example Equations

As mentioned above, a similarity function may be learned for each of the set of lower dimensional data feature(s) 104, 106, and so on. A similarity function may be expressed in a bilinear form to measure the similarity between two image features with $x_i \in R^d$ and $x_j \in R^d$ (where $x_i$ and $x_j$ represent vectors and $R^d$ represents a set of d-dimensional real-valued vectors), as follows:

$$S(x_i, x_j) = x_i^T M x_j \qquad \text{Equation (1)}$$

where $S(x_i, x_j)$ represents the similarity function and M represents a d×d matrix. The image features may have very high dimensionality d that can be for example, $10^5$ or above.

Existing similarity learning algorithms are not scalable when processing high dimensional image features because of a quadratic time complexity with respect to a high dimension d. Accordingly, in an example embodiment of the present disclosure where d is very large, the similarity function $S(x_i, x_j)$ based on a similarity matrix M is processed in a distributed and scalable way.

Accordingly, the large similarity matrix M may be decomposed or broken down into sets or blocks of smaller similarity matrices corresponding to different feature subspaces. The subspaces can be learned independently (e.g., in parallel) and the results thereof may then be combined together to approximate the optimal similarity matrix M. For example, a feature space X can be decomposed into two orthogonal subspaces (X$_1$,X$_2$) with independent distributions. As such, the optimal similarity matrix M may be represented with a block diagonal structure as follows:

$$M = \begin{pmatrix} M_1 & 0 \\ 0 & M_2 \end{pmatrix}$$

where M$_1$ and M$_2$ are the optimal similarity matrices for the two subspaces, respectively. In the above example, M$_1$ and M$_2$ can be learned independently and are later concatenated to recover the optimal similarity matrix M.

Unlike M$_1$ and M$_2$, the set of subspaces for image features comprising the projections of the features may not be independent from each other. Previous algorithms have attempted to use a supervised method to discover such block diagonal structure from a complete set of subspace distance metrics (also referred to as ensemble metric learning). However, in such previous algorithms, each of the subspace metrics has to be selected and determined in a sequential way, limiting the computational scalability.

Example embodiments of the present disclosure address the computation limitations of previous algorithms by describing a similarity learning algorithm that scales up with high feature dimension in terms of both computation and memory use without the assumptions about the feature structure made by the previous algorithms. In one example embodiment, the present similarity learning algorithm first projects the features into multiple (e.g., random) subspaces {Pn} with much lower dimension than the original space. Then, the similarity functions for all the low-dimensional subspaces, {Mn}, are learned in parallel using two or more processors. The relationship between the subspace similarity functions Mn and the similarity function for the similarity matrix M for the original space may be determined by using the linear combination of all {Mn} to approximate the true similarity matrix M as it would be learned in the original space.

It should be noted that the example methods described herein may be applied to any general image feature (e.g., gradient features, color features, or the like) and may accurately approximate the true similarity function for the similarity matrix M.

For example, given a set of labeled data $\{x_i; y_i\}$ ($x_i \in R^D$, $y_i \in R$), the similarity function $S(x_i; x_j) = x_i^T M x_j$ (see Equation (1) above) may be determined as follows. A pair of images $x_i$ and $x_j$ with same label should have higher similarity than a pair of images $x_i$ and $x_k$ with different labels. Thereafter, the optimal similarity matrix M may be determined by solving the following equation:

min $M$1 s.t. $x_i^T M x_j > x_i^T M x_k$; $\forall (i;j;k)$ with $y_i = y_j; y_i \neq y_k$; Equation (2)

Because $M \in R^{D \times D}$, the similarity matrix M has a very high dimensionality of D×D and the previous Equation (2) may not be solved directly.

In one example embodiment, a set of projection matrices $\{P_n\}$ ($P_n \in R^{K \times D}$; K<<D) is used to project the original features x to a set of lower dimensional features $\{P_n x\}$. For each projection Pn, the projected feature $P_n x$ is used to learn a lower dimensional similarity function $M_n \in R^{K \times K}$ in the corresponding subspace as expressed with the following equation:

Min $M_n$1 s.t. $(P_n x_i)^T M_n (P_n x_j) > (P_n x_i)^T M_n (P_n x_k)$; $\forall (i;j;k)$ with $y_i = y_j; y_i \neq y_k$; Equation (3)

The similarity matrix M$_n$ has a much lower dimension because the set original features are projected onto a set of substantially lower dimensional features (K<<D). In an example embodiment, K is substantially lower than D when K is at least ten times less than D. For example, if D=40,000 dimensional features in the original space, K=500 dimensions. A processing speed increase of 6,400 times may be achieved.

Therefore, Equation (3) may be solved using standard algorithms such as stochastic gradient descent. The problem in Equation (3) can be manipulated and converted to the following equation:

Min $M_n$1 s.t. $x_i^T (P_n^T M_n P_n) x_j > x_i^T (P_n^T M_n P_n) x_k$; $\forall (i;j;k)$ with $y_i = y_j; y_i \neq y_k$; Equation (4)

As such, solving M$_n$ in the subspace of P$_n$ is equivalent to finding a similarity function for the original feature space with the form of $P_n^T M_n P_n$. It is noted that the constraints to be satisfied in Equation (2) and Equation (4) may be the same. As such, if the optimal solution similarity matrix M to Equation (2) can satisfy all the constraints, then the optimal solution Mn to Equation (4) should be close to M in the low rank space of $P_n^T P_n$ as much as possible, so that the similarity function in the original space $P_n^T M_n P_n$ can also satisfy most of the constraints. Based on this observation, the similarity matrix M can be approximated as:

$M \approx P_n^T M_n P_n$; Equation (5)

The quality of the approximation depends on the projection P$_n$. If the projected signal P$_n$x$_i$ is independent of the signal projected in the null space of P$_n$, then there is a limited or no approximation error. Since there can be multiple projections {Pn} and therefore multiple different approximation of M, the linear combination 114 of the multiple projections may be used as final estimation of the similarity matrix M 116. The following equation illustrates an approximation of the final similarity matrix M 116:

$M \approx \Sigma_n w_n P_n^T M_n P_n$; Equation (6)

The linear coefficients w=[w1;w2; . . . ] can be learned using for example, linear Support Vector Machine (SVM), to maximize all the constraints as expressed in Equation (2):

min$_w$ //w//$_2$ s.t. $\Sigma_n w_n x^T_i P_n^T P_n (x_j - x_k) > 1$; $\forall (i;j;k)$ with $y_i = y_j; y_i \neq y_k$; Equation (7)

Equation (7) may be solved using a standard Support Vector Machine (SVM) solver. In an example embodiment, the projection matrix P$_n$ may be constructed in different ways, such as, using a Principal Component Analysis, a random matrix, a random selection matrix (via a random selection of subsets of the dimensions in each feature vector), or any combination of the thereof. Principal component analysis (PCA) is a mathematical procedure that uses orthogonal transformation to convert a set of observations of possibly correlated variables into a set of values of linearly uncorrelated variables called principal components. The number of principal components is less than or equal to the number of original variables. A random matrix is a matrix wherein each element of the matrix is a random number (the matrix does not have to be orthonormal).

In an example embodiment, Equation (3) may be solved for each projected subspace, and then the obtained Mn's are combined using a linear combination according to Equations (6) and (7).

Figure 2:
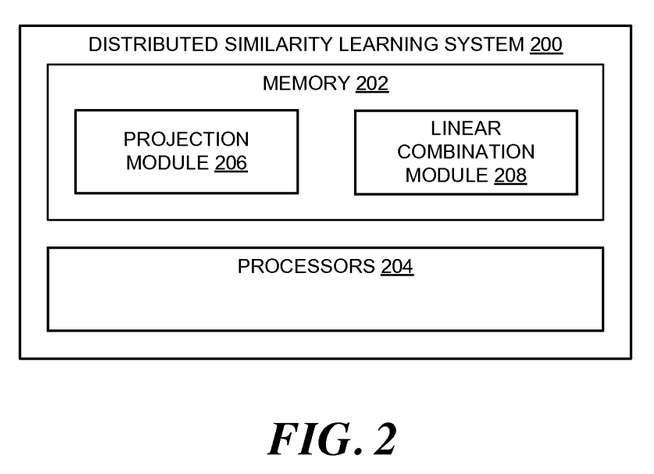
FIG. 2 is a block diagram illustrating a system, in accordance with an example embodiment, for distributed similarity learning of high-dimensional image features.

FIG. 2 is a block diagram illustrating a system 200, in accordance with an example embodiment, for distributed similarity learning of high-dimensional image features. The system 200 is shown to include a memory 202 and one or more processors 204. The memory 202 may comprise a projection module 206 and a linear combination module 208.

For example, referring back to FIG. 1, the projection module 206 may decompose the set of data features 102 into the multiple sets of lower dimensional data features 104, 106 by using a set of projection matrices ($P_1$, $P_2$, $P_n$). Thus, the projection module 206 may access a set of data features (e.g., visual features) to determine a plurality of subspaces from a space formed by the set of data features. Each subspace has a dimension substantially lower than a dimension of the set of data features. In an example embodiment, the processors 204 are then used to compute, independently and in parallel, the multiple similarity functions for the plurality of subspaces. Each similarity function may be based on the dimension of the corresponding subspace.

In an example embodiment, the projection module 206 determines a plurality of random subspaces from the space formed by the set of data features. Each random subspace may have a dimension substantially lower than the dimension of the set of data features. The projection module 206 may then compute similarity functions for the plurality of random subspaces. Each similarity function may be based on the dimension of the corresponding random subspace.

In another example embodiment, the similarity function may be based on a similarity matrix with the dimension of the set of data features. Each similarity function of the plurality of subspaces may be based on a corresponding similarity matrix that is smaller than the similarity matrix of the similarity function.

In another example embodiment, the projection module 206 forms a set of projection matrices from the set of data features. For example, the set of projection matrices may be constructed using orthonormal random matrix with random dimensions.

The projection module 206 then uses the set of projection matrices to project the set of data features to a set of lower dimensional data features. For example, the set of lower dimensional data features may be at least ten times lower than the original set of projection matrices. For each projection matrix, the projection module 206 generates a lower dimensional similarity function in a corresponding subspace defined by the projection matrix.

The linear combination module 208 performs a linear combination of the lower dimensional similarity functions to compute the similarity matrix. For example, the linear combination comprises a linear coefficient for each similarity function of the subspaces. The linear coefficient may be determined using a linear support vector machine.

As such, the learning similarity matrix M in the original space has a computation complexity of $O(D^2)$, and learning in one projected subspace has computation complexity of $O(K^2)$ where D and K are the dimensionality of the original space and projected space respectively. For example, if N subspaces are used and each similarity matrix $M_n$ is learned in parallel on N computers, then a speedup of $(D/K)^2$ times is achieved. If all the similarity matrices $M_n$'s are trained on one computer, there would still be a processing speed gain of $(D/K)^2=N$ times.

Figure 3:
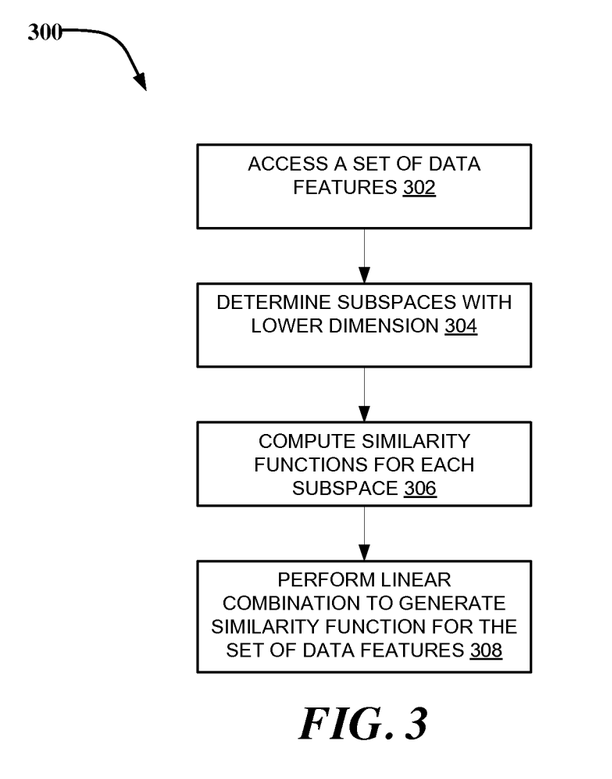
FIG. 3 is a flow diagram of a further method, in accordance with an example embodiment, for distributed similarity learning of high-dimensional image features.

FIG. 3 is a flow diagram of a method 300, in accordance with an example embodiment, for distributed similarity learning of high-dimensional image features. At operation 302, a set of data features are accessed. Thereafter, at operation 304, a plurality of subspaces is determined from a space formed by the set of data features, each subspace having a dimension substantially lower than a dimension of the set of data features. In an example embodiment, the operation 304 may be performed using the projection module 206 of the distributed similarity learning system 200 of FIG. 2.

At operation 306, a plurality of similarity functions for the plurality of subspaces is computed. Each similarity function may be based on the dimension of the corresponding subspace. In an example embodiment, the operation 306 may be performed using the projection module 206 of the distributed similarity learning system 200 of FIG. 2.

Thereafter, a linear combination of the plurality of similarity functions is performed to determine a similarity function for the set of data features (see operation 308). In an example embodiment, the operation 308 may be performed using the linear combination module 208 of the distributed similarity learning system 200 of FIG. 2.

Figure 4:
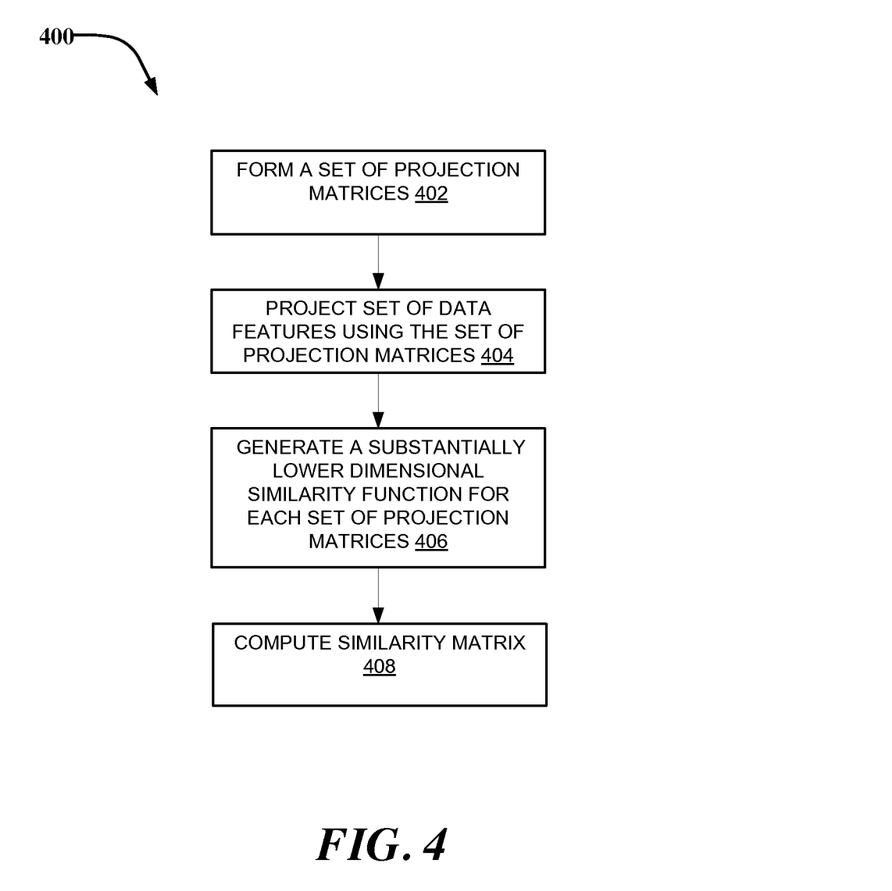
FIG. 4 is a flow diagram of a method, in accordance with an example embodiment, for a distributed similarity learning for high-dimensional image features.

FIG. 4 is a flow diagram illustrating a further method 400, in accordance with an example embodiment, for distributed similarity learning of high-dimensional image features. At operation 402, a set of projection matrices is formed from the set of data features. The operation 402 may be performed using the projection module 206 of the distributed similarity learning system 200 of FIG. 2.

At operation 404, the set of projection matrices is used to project the set of data features to a set of substantially lower dimensional data features. For each projection matrix, a substantially lower dimensional similarity function is generated in a corresponding subspace defined by the projection matrix. The operation 406 may be performed using the projection module 206 of the distributed similarity learning system 200 of FIG. 2.

At operation 408, a linear combination of the substantially lower dimensional similarity functions is performed to compute the similarity matrix. In an example embodiment, the operation 408 may be performed using the linear combination module 208 of the distributed similarity learning system 200 of FIG. 2.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. For example, software may accordingly configure a processor to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and a server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below, are set out hardware (e.g., machine) and software architectures that may be deployed in various example embodiments.

Example Machine Architecture and Machine-Readable Medium

Figure 5:
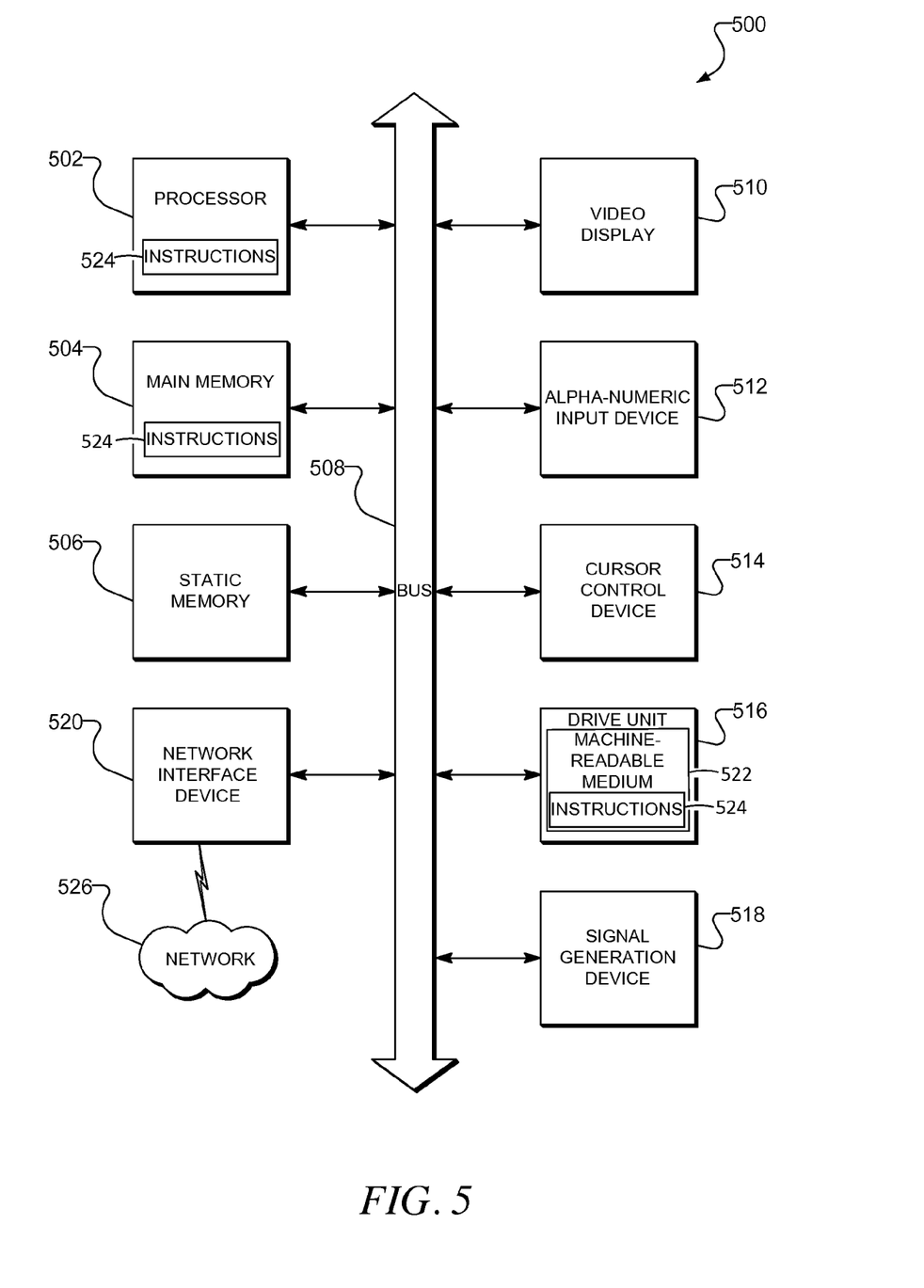
FIG. 5 shows a diagrammatic representation of a machine in the example form of a computer system within which a set of instructions may be executed to cause the machine to perform any one or more of the methodologies discussed herein.

FIG. 5 is a block diagram of a machine in the example form of a computer system 500 within which instructions (e.g., 524) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (e.g., 524—sequential or otherwise) that specify actions to be taken by that machine. Further, while only a single machine is illustrated, the term "machine" shall also be taken to include any collection of machines that individually or jointly execute a set (or multiple sets) of instructions (e.g., 524) to perform any one or more of the methodologies discussed herein.

The example computer system 500 includes a processor 502 (e.g., a central processing unit (CPU), a graphics processing unit (GPU), a virtual processor, a multicore process or a combination thereof), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions (e.g., 524) for execution by the machine and that cause the machine to perform any one or more of the methodologies of the present embodiments, or that is capable of storing, encoding or carrying data structures utilized by or associated with such instructions (e.g., 524). The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; compact disc-read-only memory (CD-ROM) and digital versatile disc (or digital video disc) read-only memory (DVD-ROM) disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks 526 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., 524) for execution by the machine, and includes digital or analog communication signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Although specific embodiments have been illustrated and described herein, it should be appreciated that any arrangement calculated to achieve the same purpose may be substituted for the specific embodiments shown. This disclosure is intended to cover any and all adaptations or variations of several embodiments. Combinations of the above embodiments and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description with each claim standing on its own as a separate embodiment.

What is claimed is:

1. A method comprising:
    accessing a set of data features corresponding to an image;
    determining a plurality of orthogonal subspaces from a space formed by the set of data features using a set of projection matrices, each subspace having a set of lower dimension data features than a dimension of the set of data features;
    learning, in parallel, an optimal matrix for each of a plurality of similarity functions for the plurality of orthogonal subspaces that generates a similarity measure consistent with a respective set of lower dimension data features as constraints, wherein each similarity function is based on a dimension of a corresponding subspace;
    solving a combined similarity function, using a support vector machine, the combined similarity function based on a combination of each learned optimal matrix; and
    based on the solving, associating a tag, title, description, or metadata to the image to search a collection of images.

2. The method of claim 1, further comprising:
computing the plurality of similarity functions for the plurality of subspaces in parallel in a plurality of processors.

3. The method of claim 1, wherein determining the plurality of subspaces further comprises:
determining a plurality of random subspaces from the space formed by the set of data features, each random subspace having a dimension substantially lower than the dimension of the set of data features; and
computing the plurality of similarity functions for the plurality of random subspaces, each similarity function based on a dimension of a corresponding random subspace.

4. The method of claim 1, wherein the combined similarity function is based on a large similarity matrix with the dimension of the set of data features,
wherein each similarity function of the plurality of subspaces is based on a corresponding similarity matrix that is smaller than the large similarity matrix of the combined similarity function.

5. The method of claim 1, further comprising:
forming the set of projection matrices from the set of data features;
using the set of projection matrices to project the set of data features to a set of substantially lower dimensional data features;
for each projection matrix, generating a substantially lower dimensional similarity function in a corresponding subspace defined by the projection matrix; and
performing a linear combination of the substantially lower dimensional similarity functions to compute the similarity matrix.

6. The method of claim 5, wherein the set of projection matrices is constructed by random matrices, random selection matrices, or principal component analysis,
wherein the linear combination comprises a linear coefficient for each similarity function of the subspaces, the linear coefficient determined using a linear support vector machine.

7. The method of claim 1, further comprising:
using the combined similarity function for the set of data features to determine a similarity between a first image and a second image, the set of data features from the first and second image; and
providing a same tag to the first image and the second image based on the similarity between the image and the second image.

8. A system comprising:
a plurality of processors;
computer storage media storing computer-usable instructions that, when used by the plurality of processors, causes the plurality of processors to:
access a set of data features corresponding to an image;
determine a plurality of orthogonal subspaces from a space formed by the set of data features using a set of projection matrices, each subspace having a set of lower dimension data features than a dimension of the set of data features;
learning, in parallel, an optimal matrix for each of a plurality of similarity functions for the plurality of orthogonal subspaces that generates a similarity measure consistent with a respective set of lower dimension data features as constraints, wherein, each similarity function is based on a dimension of a corresponding subspace:

solve the combined similarity function, using a support vector machine, the combined similarity function based on a combination of each learned optimal matrix; and
based on the solving, associate a tag, title, description, or metadata to the image.

9. The system of claim 8, wherein the system computes the plurality of similarity functions for the plurality of subspaces in parallel using the plurality of processors.

10. The system of claim 8, wherein the system further:
determines a plurality of random subspaces from the space formed by the set of data features, each random subspace having a dimension substantially lower than the dimension of the set of data features; and
computes the plurality of similarity functions for the plurality of random subspaces, each similarity function based on a dimension of a corresponding random subspace.

11. The system of claim 8, wherein the similarity function is based on a similarity matrix with the dimension of the set of data features,
wherein each similarity function of the plurality of subspaces is based on a corresponding similarity matrix that is smaller than the similarity matrix of the similarity function.

12. The system of claim 8, wherein the system further:
forms the set of projection matrices from the set of data features;
uses the set of projection matrices to project the set of data features to a set of substantially lower dimensional data features;
for each projection matrix, generates a substantially lower dimensional similarity function in a corresponding subspace defined by the projection matrix; and
performs a linear combination of the substantially lower dimensional similarity functions to compute the similarity matrix.

13. The system of claim 12, wherein the set of projection matrices is constructed using by random matrices, random selection matrices, or principal component analysis,
wherein the linear combination comprises a linear coefficient for each similarity function of the subspaces, the linear coefficient determined using a linear support vector machine.

14. The system of claim 8, wherein the system further uses the similarity function for the set of data features to determine a similarity between a first image and a second image, the set of data features from the first and second image, and to provide a same tag to the first image and the second image based on the similarity between the image and the second image.

15. A non-transitory machine-readable storage medium storing instructions which, when executed by at least one processor, performs operations comprising:
accessing a set of data features corresponding to an image;
determining a plurality of orthogonal subspaces from a space formed by the set of data features using a set of projection matrices, each subspace having a set of lower dimension data features than a dimension of the set of data features;
learning, in parallel, an optimal matrix for each of a plurality of similarity functions for the plurality of orthogonal subspaces that generates a similarity measure consistent with a respective set of lower dimension data features as constraints, wherein each similarity function is based on a dimension of a corresponding subspace;

solving the combined similarity function, using a support vector machine, the combined similarity function based on a combination of each learned optimal matrix; and based on the solving, associating a tag, title, description, or metadata to the image.

16. The storage medium of claim 15, wherein the operations further comprises:

computing the plurality of similarity functions for the plurality of subspaces independently in parallel in a plurality of processors.

17. The storage medium of claim 15, wherein the operations further comprises:

determining a plurality of random subspaces from the space formed by the set of data features, each random subspace having a dimension substantially lower than the dimension of the set of data features; and computing the plurality of similarity functions for the plurality of random subspaces, each similarity function based on a dimension of a corresponding random subspace.

18. The storage medium of claim 15, wherein the combined similarity function is based on a large similarity matrix with the dimension of the set of data features, wherein each similarity function of the plurality of subspaces is based on a corresponding similarity matrix that is smaller than the large similarity matrix of the combined similarity function.

19. The storage medium of claim 15, wherein the operations further comprises:

forming the set of projection matrices from the set of data features;

using the set of projection matrices to project the set of data features to a set of substantially lower dimensional data features;

for each projection matrix, generating a substantially lower dimensional similarity function in a corresponding subspace defined by the projection matrix; and performing a linear combination of the substantially lower dimensional similarity functions to compute the similarity matrix, wherein the set of projection matrices is constructed using by random matrices, random selection matrices, or principal component analysis.

20. The storage medium of claim 15, wherein the operations further comprises:

using the similarity function for the set of data features to determine a similarity between a first image and a second image, the set of data features from the first and second image; and providing a same tag to the first image and the second image based on the similarity between the image and the second image.

* * * * *